United States Patent
Yang et al.

(10) Patent No.: US 11,354,224 B2
(45) Date of Patent: Jun. 7, 2022

(54) CONSTRUCTION METHOD OF TEST CASE CONSTRAINT CONTROL TECHNOLOGY BASED ON EPIGENETICS

(71) Applicant: BEIHANG UNIVERSITY, Beijing (CN)

(72) Inventors: Shunkun Yang, Beijing (CN); Xiaodong Gou, Beijing (CN); Daqing Li, Beijing (CN); Wenjing Liu, Beijing (CN); Tingting Huang, Beijing (CN); Fuping Zeng, Beijing (CN); Chong Bian, Beijing (CN); Qi Yao, Beijing (CN); Yushu Xie, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 801 days.

(21) Appl. No.: 16/198,601

(22) Filed: Nov. 21, 2018

(65) Prior Publication Data

US 2019/0087313 A1    Mar. 21, 2019

(30) Foreign Application Priority Data

Apr. 19, 2018  (CN) .......................... 201810353435.2

(51) Int. Cl.
*G06F 11/36* (2006.01)
*G06N 3/12* (2006.01)

(52) U.S. Cl.
CPC ...... *G06F 11/3684* (2013.01); *G06F 11/3688* (2013.01); *G06N 3/126* (2013.01)

(58) Field of Classification Search
CPC .............. G06F 11/36–3696; G06N 3/086; G06N 3/12; G06N 3/126
See application file for complete search history.

(56) References Cited

PUBLICATIONS

Estero-Botaro, A., et al. (2014) A Framework for Genetic Test-Case Generation for WS-BPEL Compositions. In: Merayo M.G., de Oca E.M. (eds) Testing Software and Systems. ICTSS 2014. Lecture Notes in Computer Science, vol. 8763. Springer, Berlin, Heidelberg, pp. 1-16.*

La Cava, W., et al., Genetic Programming with Epigentic Local Search, In Proceedings of the 2015 Annual Conference on Genetic and Evolutionary Computation, ACM, 2015, pp. 1055-1062.*

(Continued)

*Primary Examiner* — Todd Aguilera

(57) ABSTRACT

A construction method of a test case constraint control technology based on epigenetics includes steps of: 1: defining a fitness function, a genetic coding method, and a constraint control rule; 2: initializing parameters: setting a population size, an evolution number, and a termination fitness function value; 3: initializing a population: randomly generating an initial population; 4: performing evolution termination judgment; 5. performing constraint regulation based on the epigenetics: performing constraint methylation and constraint acetylation according to the constraint control rule; 6: selecting individuals; 7: completing epigenetic evolution of the population; and 8: outputting a test case set; wherein through the above steps, construction of an epigenetic test case constraint control technology is completed, so as to design test cases that are more in line with the actual operation conditions of the software, find more potential software failures, and improve the quality of software testing.

8 Claims, 2 Drawing Sheets

(56) References Cited

PUBLICATIONS

Sthamer, H.H., The Automatic Generation of Software Test Data Using Genetic Algorithms, University of Glamorgan, 1995, whole document.*

Stolfi, D., et al., Epigenetic Algorithms: A New Way of Building GAs Based on Epigenetics, Information Sciences, vol. 424 [online], 2018 [retrieved Sep. 11, 20121], Rerieved From Internet: <URL: https://www.researchgate.net/publication/320338126_EpiGenetic_Algorithms_A_New_Way_of_Building_GAs_Based_on_Epi1>, pp. 1-28.*

* cited by examiner

CONSTRUCTION METHOD OF TEST CASE CONSTRAINT CONTROL TECHNOLOGY BASED ON EPIGENETICS

CROSS REFERENCE OF RELATED APPLICATION

The present invention claims priority under 35 U.S.C. 119(a-d) to CN 201810353435.2, filed Apr. 19, 2018.

BACKGROUND OF THE PRESENT INVENTION

Field of Invention

The present invention provides a construction method of a test case constraint control technology based on epigenetics, which relates to realizing the test case constraint to control technology based on the epigenetics, and belongs to a field of software reliability and test.

Description of Related Arts

With the rapid development of computer technology, the function of software has become more and more powerful, and its scale and complexity have also increased dramatically. In order to reduce software failures and improve reliability, it is necessary to find software failures and troubleshoot through software testing before the software is officially released. One of the core issues of software testing is the generation of test cases. To some extent, the quality of test cases determines the quality of software tests. When the software runs in different environments, it will show different operational stability. How to fully consider the various constraints under actual operating conditions when designing test cases becomes an important issue in software testing. At the same time, various constraints should be controllable, and constraints should be adjustable when designing test cases according to actual conditions, such as opening/closing and enhancement/attenuation of the constraints. Meanwhile, due to the large scale of modern software, conventional testing methods are time-consuming and labor-intensive, and the cost is high. Implementing test automation has become an important method to reduce costs. The automatic generation and automatic execution of test cases is the main content of test automation. Conventionally, successful practice of automatic generation of test cases is to simulate various natural evolution processes in biology to seek a test case set that meet the coverage standards, wherein the theory of genetics is the most extensive and mature.

Genetics theory believes that DNA sequences determine the phenotype of a living organism. The concept of Epigenetics is based on genetics, which refers to the "heritable" phenomenon that changes the phenotype by non-DNA mutations. It is defined as a phenotypic change that stably inherits without mutation of the DNA sequence. The Phenotype, also known as trait, refers to a trait or characteristic of an organism or cell that can be observed, and is the result of interaction between a specific genotype and the environment. Epigenetic regulatory mechanisms include DNA modification, histone modification, non-coding RNA regulation, chromatin remodeling, and nucleosome localization. DNA methylation is a natural DNA modification method and is the most well-researched epigenetic modification. DNA methylation leads to conformational changes in some regions of DNA, which affects the interaction between proteins and DNA. When methylation reaches a certain level, the bound originals, on which many of the protein factors rely, are indented into the major groove, which is not conducive to the initiation of transcription, resulting in gene inactivation. At the same time, methylation at different sites can inhibit or promote the expression of genes. Hi stone acetylation can attenuate the interaction of histone-DNA or nucleosome-nucleosome by charge neutralization, or cause conformational changes that disrupt stable nucleosome structures. The acetylated histones can also recruit other related factors to enter a gene locus, affecting transcription. In short, both methylation and acetylation control gene expression and produce stable phenotypic changes without altering the gene sequence.

When the software is running, due to the complex operating environment, it may face various constraints, which leads to various software failures. There are many factors that cause software failure, which may be constraints such as software timing, scheduling, shared memory protection, and interrupt handling. It may also be a hardware environment constraint, and even some external interference signals may also cause accidental failure to processing logic and interface information of the software. These internal and external constraints should also be considered in the design of the test case when performing software testing, where controls of on/off, enhancement/attenuation, and genetic/non-genetic of these constraints (in the automatic generation of test cases, constraints, which continuously exist, are considered to be genetic) is a problem that should be addressed. Conventionally, a relatively mature automatic test case generation method focuses on the improvement of the coverage of the generated test case set. The constraints and dependencies therebetween are not taken into account in the design of the test cases. In response to this situation, the present invention provides a construction is method of a test case constraint control technology based on epigenetics. In this technique, epigenetic theory is used for epigenetic regulation of various constraints without changing the program itself. The present invention provides a genetic modification mechanism similar to methylation and acetylation for constraint (gene) regulation, including operations such as on/off, enhancement/attenuation, and genetic/non-genetic regulation. Compared with DNA, the heritable information of the epigenetic category is more susceptible to the environment, and it is more prone to dynamic and reversible changes, so it is more suitable for the evolutionary control of constraints. Using this technology, you can make full use of the conventional epigenetic knowledge to generate software test cases that are more in line with actual use and improve the quality of the test.

The software test case generation technology is constructed based on epigenetic theory to form an epigenetic test case constraint control technology to improve the software test quality while achieve the purpose of improving software credibility.

SUMMARY OF THE PRESENT INVENTION

Conventional test case automatic generation method focuses on the improvement of the coverage of the generated test case set to the program itself, so as to detect errors in the software. However, there are many factors that cause software failure, not only timing, scheduling, interrupt processing and other constraints of the software, but also hardware environment constraints, and even some external interference signals sometimes cause accidental failure to processing logic and interface information of the software. Regardless of the various constraints faced by various software runtimes, such test cases can only detect errors in the software under laboratory conditions, and there is nothing that can be done with software failures under actual constraints. Therefore, the present invention, in conjunction with epigenetic theory, provides a construction method of a test case constraint control technology based on epigenetics. Epigenetic theory refers to a phenotypic change that stably inherits without mutation of the DNA sequence. The epigenetic mechanism can be used to control the constraints without changing the program itself, including on/off, enhancement/attenuated, genetic/non-genetic and other evolutionary operations. That is to say, a genetic modification mechanism similar to methylation and acetylation is provided, and constraint (gene) regulation is performed, wherein some constraints are expressed, and some constraints are not expressed. In the present invention, a new constraint epigenetic operation operator is designed, including: constraint methylation-corresponding to constraint on mode, which can be added to subsequent genetic processes; and constraint acetylation-corresponding to constraint off mode, which can avoid being added to the subsequent genetic processes. The heritable information in the epigenetic category is more affected by the environment, and it is more prone to dynamic and reversible changes, so it is more suitable for constraint genetic evolutionary control. This technology can help testers to design test cases that are more in line with the actual operation conditions of the software, to find more potential software failures, and to improve the quality of software testing.

It can be seen that the construction of the technology integrates and innovates the conventional evolutionary test case generation technology and epigenetic theory, and forms a test case constraint control technology based on the epigenetics.

In the method of the present invention, ETCC is used to express the test case constraint control technology based on epigenetics.

Accordingly, in order to accomplish the above objects, the present invention provides a construction method of a test case constraint control technology based on epigenetics, comprising steps of:

Step 1: defining a fitness function, a genetic coding method, and a constraint control rule;

Step 2: initializing parameters: setting a population size, an evolution number, and a termination fitness function value;

Step 3: initializing a population: randomly generating an initial population;

Step 4: performing evolution termination judgment;

Step 5: performing constraint regulation based on the epigenetics: performing constraint methylation and constraint acetylation according to the constraint control rule;

Step 6: selecting individuals;

Step 7: completing epigenetic evolution of the population; and

Step 8: outputting a test case set.

In the step 1, the fitness function, the genetic coding method, and the constraint control rule are defined as: the fitness function is a measure of individual survival in the evolution of the population; in the software test, a coverage reflects a quality of the test case set; in the construction method, the coverage is used as the fitness function F(x), wherein the coverage is obtained directly with a test tool Testbed;

coding refers to describing a feasible solution to a problem, which is a method for converting the feasible solution from a solution space of a practical problem to a search space which can be processed by an epigenetic method; the construction method selects real number coding, wherein assuming a variable of one individual has D dimensions, then an i-th individual $X_i$ of the population is expressed as $X_i=[x_{i1}, x_{i2}, \cdots, x_{ij}, \cdots, x_{iD}]$, wherein i=1, 2, $\cdots$, $N_{pop}$, j=1, 2, $\cdots$, D, $N_{pop}$ is the population size, which is a total number of the individuals in the population, $x_{ij}$ is a real variable within a range of $[L_{input}, U_{input}]$, $[L_{input}, U_{input}]$ is upper and lower limits inputted by the program to be tested;

the constraint control rule refers to determining when the constraints are added, and when the constraints are stopped; from adding to stopping, the constraints inherit with the evolution of the population; meanwhile, sizes of the constraints to be imposed need to be determined; the constraints refer to hardware environment constraints for the software at runtime, as well as external noise interference constraints; the constraints faced by the software are presented as interference to normal inputs of the program during the test, wherein assuming there are $N_C$ possible constraints, a D-dimensional real variable is used to quantify the i-th constraint as $C_i[c_{i1}, c_{i2}, \cdots, c_{ij}, \cdots, c_{iD}]$, wherein i=1, 2, $\cdots$, $N_C$, j=1, 2, $\cdots$, D, D is a dimension number of the constraints; the dimension number of the individuals of the same population is consistent; a real variable obtained by quantifying the constraints faced by the software is added to subsequent evolution of the test cases by the epigenetic regulation, so as to realize genetic evolutionary control of the constraints; the constraint control rule is formulated according to an actual operation of the software, besides start and end times, a value of $C_i$, which represents strength of the constraints, is also determined according to an actual demand, and is selectively added during an evolution process;

in the construction method, the population represents the test case set, and the individuals of the population are the test cases.

In the step 2, initializing the parameters: setting the population size, the evolution number, and the termination fitness function value specifically comprises steps of: setting the population size $N_{pop}$, the evolution number $I_{pop}$, and the termination fitness function value $F_{stop}$ according to actual needs;

wherein the population size $N_{pop}$ represents how many test cases are generated at a time, which is determined according to actual conditions of the program to be tested; in theory, a test case set with a higher coverage is always available with a higher evolution number, but after reaching a certain number, the coverage increases less obviously or no longer increases; in addition, more evolutions bring higher hardware to requirements and correspondingly more time consumption; therefore, balance is needed according to the actual needs, and the termination evolution number $I_{stop}$ is considered; similarly, an excessive termination fitness function value $F_{stop}$ is directly unattainable, which is only a waste of computing resources, and needs to be considered comprehensively.

In the step 3, initializing the population: randomly generating the initial population is defined as: an i-th individual $X_i$ of the population is expressed as $X_i=[x_{i1}, x_{i2}, \cdots, x_{ij}, \cdots, x_{iD}]$, $[L_{input}, U_{input}]$ is upper and lower limits inputted by the program to be tested; randomly generating the initial population is randomly selecting $x_{ij}$ within a range of $[L_{input}, U_{input}]$ to determine a value of the individual $X_i$, so as to generate the initial population and mark the initial population with $P_0$.

In the step 4, performing the evolution termination judgment specifically comprises steps of: using a software test tool Testbed to obtain a fitness function value F of the initial population; if $F<F_{stop}$ and the evolution number is smaller than the termination evolution number $I_{stop}$, then continuing the epigenetic evolution of the population; otherwise, stopping the evolution and outputting the initial population as the test case set.

In the step 5, performing the constraint regulation based on the epigenetics: performing the constraint methylation and the constraint acetylation according to the constraint control rule is defined as: the constraint methylation-corresponding to a constraint on mode adds a quantized constraint $C_i$ into the population to participate in the evolution; since both the constraint $C_i$ and the individual $X_i$ have D dimensions, the individual is mutated by directly adding the constraint to the individual, so as to generate a new individual; $X'_i$ is used to mark the new individual generated by methylation, and $X'_i=X_i+\lambda C_i$, wherein $\lambda$ is a scaling factor, an intensity of the constraint is controlled by setting a value of $\lambda$; accordingly, all individuals of a population $P_0$ are updated, thus to forming a new population $P'_0$, which is the evolution of the population; if the constraint is not stopped, the constraint always exists in a genetic process, and continues to affect the evolution of the population;

in addition, the constraint acetylation-corresponding to a constraint off mode of the construction method sets $\lambda=0$, which stops the constraint, and the constraint no longer affects the evolution of the population.

In the step 6, selecting the individuals specifically comprises steps of: calculating a fitness value of a new population obtained by the epigenetic evolution, selecting $N_{pop}$ individuals with highest fitness among a parent population $P_0$ and a new population $P'_0$, keeping the population size unchanged, and forming a new population $P_1$ for a next round of evolution;

wherein the construction method is based on the epigenetic theory, which regulates the constraints by methylation and acetylation without changing a gene sequence, and thus causing no common genetic variation and cross-genetic manipulation; after the methylation and the acetylation, only the individuals with the highest fitness are selected through selection operations to form the new population, which directly participate in subsequent epigenetic operations.

In the step 7, completing the epigenetic evolution of the population specifically comprises steps of: after obtaining a new population $P_1$ by the epigenetic evolution in the step 6, repeating the steps 4-6 until the predetermined evolution number is reached and population fitness is not less than the termination fitness function value $F_{stop}$, then stopping the evolution, which complete the epigenetic evolution of the population.

In the step 8, outputting the test case set specifically comprises steps of: after the epigenetic evolution of the population is completed, outputting the population, wherein the population is the test case set meeting requirements.

Through the above steps, construction of an epigenetic test case constraint control technology is completed; with an epigenetic theory, a program is unchanged during a test, and the epigenetic regulation is performed on various constraints; modification mechanism of methylation and acetylation are provided, comprising on/off, enhancement/attenuation, and genetic/non-genetic control operations to constraints, in such a manner that test cases produced sufficiently reflect an actual operation condition of software; software failure detection problems during actual software tests are solved, so as to help software testers to consider actual constraints faced by software operations into design of the test cases during testing, thus enabling the test cases to be purposeful, discovering more software failures, improving software testing quality, and providing a high practical value.

Compared with the prior art, advantages of the present invention are that: conventional test case automatic generation method focuses on the improvement of the coverage to the program itself, so as to detect errors in the software. However, there are many factors that cause software failure, not only timing, scheduling, interrupt processing and other constraints of the software, but also hardware environment constraints, and even some external interference signals sometimes cause accidental failure to processing logic and interface information of the software. Regardless of the various constraints faced by various software runtimes, such test cases can only detect errors in the software under laboratory conditions, and there is nothing that can be done with software failures under actual constraints. Therefore, the present invention, in conjunction with epigenetic theory, provides a genetic modification mechanism similar to methylation and acetylation, and constraint regulation is performed, so as to generate test cases that are more in line with the actual operation of the software. The present invention integrates and innovates conventional epigenetic theory and automatic test case generation method, and provides an epigenetic test case constraint control technology based on epigenetics.

REFERENCE ELEMENT

Figure 1:
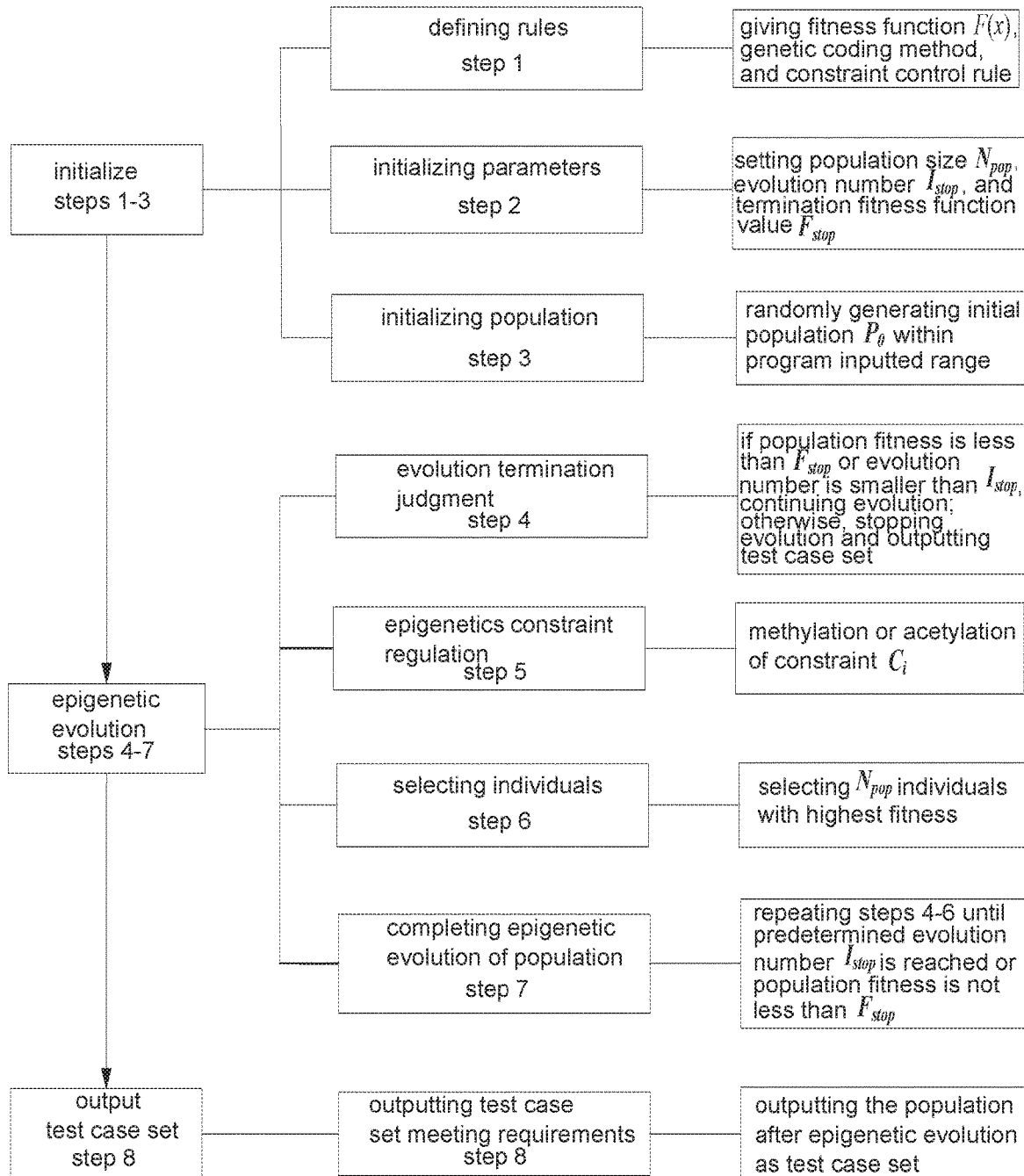
FIG. 1 is an overall flow chart of a method of the present invention.
Figure 2:
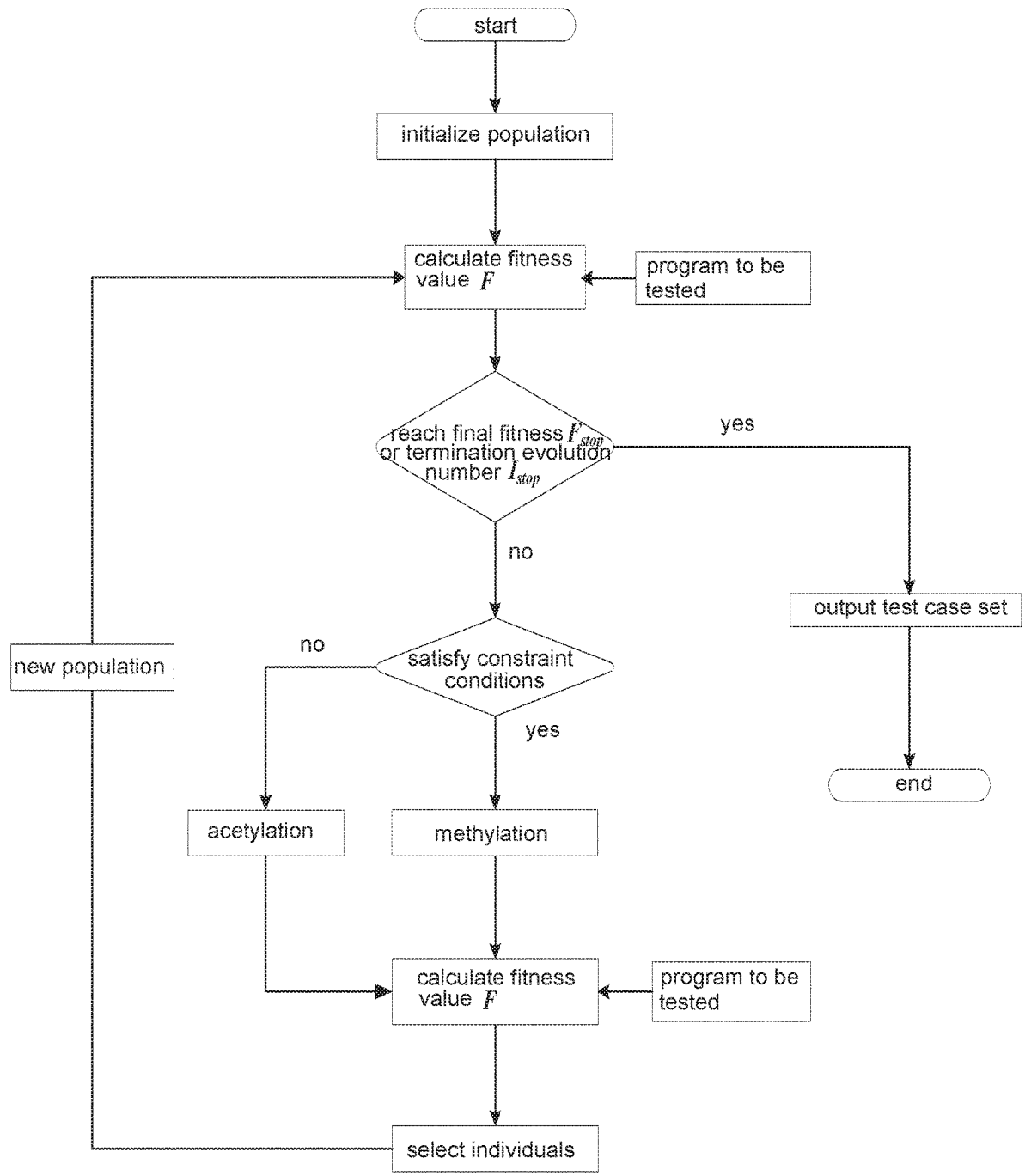
FIG. 2 is a flow chart of test case constraint control based on epigenetics.

In FIG. 1, steps 1-8 are corresponding steps of the present invention;

In FIG. 1, fix) is a fitness function;

In FIG. 1, $N_{pop}$, $I_{stop}$, $F_{stop}$ are respectively a population size, a termination evolution number, and a termination fitness function value;

In FIG. 1, P0 and $C_i$ are an initial population and a constraint;

In FIG. 2, $I_{stop}$, $F_{stop}$ are respectively the termination evolution number and the termination fitness function value;

In FIG. 2, F is a fitness value of a current population.

DETAILED DESCRIPTION OF THE PREFERRED EMBODIMENT

Objectives, features, and advantages of the present invention will become apparent from the following detailed description, the accompanying drawings, and the appended claims.

The present invention provides a construction method of a test case constraint control technology based on epigenetics. Techniques built with such method can improve the quality of software testing. In the technique, a genetic modification mechanism similar to methylation and acetylation is provided for constraint regulation, including on/off, enhancement/attenuation, genetic/non-genetic evolutionary operations. This to technology can consider various practical constraints faced by the software during the generation of the test cases, and generate test cases that are more in line with the actual conditions, thus finding more software errors.

The present invention provides a construction method of a test case constraint control technology based on epigenetics as shown in FIG. 1, comprising steps of:

Step 1: defining a fitness function, a genetic coding method, and a constraint control rule; wherein:

the fitness function is a measure of individual survival in the evolution of the population; in the software test, a coverage reflects a quality of the test case set; in the construction method, the coverage is used as the fitness function F(x), wherein the coverage is obtained directly with a test tool Testbed;

coding refers to describing a feasible solution to a problem, which is a method for converting the feasible solution from a solution space of a practical problem to a search space which can be processed by an epigenetic method; the construction method selects real number coding, wherein assuming a variable of one individual has D dimensions, then an i-th individual $X_i$ of the population is expressed as $X_i=[x_{i1}, x_{i2}, \cdots, x_{ij}, \cdots, x_{iD}]$, wherein i=1, 2, $\cdots$, $N_{pop}$, j=1, 2, $\cdots$, D, $N_{pop}$ is the population size, which is a total number of the individuals in the population, $x_{ij}$ is a real variable within a range of $[L_{input}, U_{input}]$, $[L_{input}, U_{input}]$ is upper and lower limits inputted by the program to be tested;

the constraint control rule refers to determining when the constraints are added, and when the constraints are stopped; from adding to stopping, the constraints inherit with the evolution of the population; meanwhile, sizes of the constraints to be imposed need to be determined; the constraints refer to hardware environment constraints for the software at runtime, as well as external noise interference constraints; the constraints faced by the software are presented as interference to normal inputs of the program during the test, wherein assuming there are $N_C$ possible constraints, a D-dimensional real variable is used to quantify the i-th constraint as $C_i=[c_{i1}, c_{i2}, \cdots, c_{ij}, \cdots, c_{iD}]$, wherein i=1, 2, $\cdots$, $N_C$, j=1, 2, $\cdots$, D, D is a dimension number of the constraints; the dimension number of the individuals of the same population is consistent; a real variable obtained by quantifying the constraints faced by the software is added to subsequent evolution of the test cases by the epigenetic regulation, so as to realize genetic evolutionary control of the constraints; the constraint control rule is formulated according to an actual operation of the software, besides start and end times, a value of $C_i$, which represents strength of the constraints, is also determined according to an actual demand, and is selectively added during an evolution process; the constraint control of the present invention requires to simulate the constraints that the software faces at runtime as much as possible, in such a manner that the generated test cases are more purposeful and more software errors are found;

in the construction method, the population represents the test case set, and the individuals of the population are the test cases;

Step 2: initializing parameters: setting a population size, an evolution number, and a termination fitness function value; which specifically comprises steps of:

setting the population size $N_{pop}$, the evolution number $I_{stop}$, and the termination fitness function value $F_{stop}$ according to actual needs; wherein the population size $N_{pop}$ represents how many test cases are generated at a time, which is determined according to actual conditions of the program to be tested; in theory, a test case set with a higher coverage is always available with a higher evolution number, but after reaching a certain number, the coverage increases less obviously or no longer increases; in addition, more evolutions bring higher hardware requirements; therefore, the termination evolution number $I_{stop}$ is considered according to the actual needs; similarly, an excessive termination fitness function value $F_{stop}$ is directly unattainable, which is only a waste of computing resources, and needs to be considered comprehensively, higher dose not always mean better;

Step 3: initializing a population: randomly generating an initial population; wherein:

an i-th individual $X_i$ of the population is expressed as $X_i=[x_{i1}, x_{i2}, \cdots, x_{ij}, \cdots, x_{iD}]$, $[L_{input}, U_{input}]$ is upper and lower limits inputted by the program to be tested; randomly generating the initial population is randomly selecting $x_{ij}$ within a range of $[L_{input}, U_{input}]$ to determine a value of the individual $X_i$, so as to generate the initial population and mark the initial population with $P_0$;

Step 4: performing evolution termination judgment; specifically comprises steps of:

using a software test tool Testbed to obtain a fitness function value F of the initial population; if $F<F_{stop}$ and the evolution number is smaller than the termination evolution number $I_{stop}$, then continuing the epigenetic evolution of the population; otherwise, stopping the evolution and outputting the initial population as the test case set;

Step 5: performing constraint regulation based on the epigenetics: performing constraint methylation and constraint acetylation according to the constraint control rule; wherein:

the constraint methylation-corresponding to a constraint on mode adds a quantized constraint $C_i$ into the population to participate in the evolution; since both the constraint $C_i$ and the individual $X_i$ have D dimensions, the individual is mutated by directly adding the constraint to the individual, so as to generate a new individual; $X'_i$ is used to mark the new individual generated by methylation, and $X'_i=X_i+\lambda C_i$, wherein $\lambda$ is a scaling factor, an intensity of the constraint is controlled by setting a value of $\lambda$; to accordingly, all individuals of a population $P_0$ are updated, thus forming a new population $P'_0$, which is the evolution of the population; if the constraint is not stopped, the constraint always exists in a genetic process, and continues to affect the evolution of the population;

in addition, the constraint acetylation-corresponding to a constraint off mode of the construction method sets $\lambda=0$, which stops the constraint, and the constraint no longer affects the evolution of the population;

Step 6: selecting individuals; specifically comprises steps of:

calculating a fitness value of a new population obtained by the epigenetic evolution, selecting $N_{pop}$ individuals with highest fitness among a parent population $P_0$ and a new population $P'_0$, keeping the population size unchanged, and forming a new population $P_1$ for a next round of evolution;

wherein the construction method is based on the epigenetic theory, which regulates the constraints by methylation and acetylation without changing a gene sequence, and thus causing no common genetic variation and cross-genetic manipulation; after the methylation and the acetylation, only the individuals with the highest fitness are selected through selection operations to form the new population, which directly participate in subsequent epigenetic operations;

Step 7: completing epigenetic evolution of the population; specifically comprises steps of:

after obtaining a new population $P_1$ by the epigenetic evolution in the step 6, repeating the steps 4-6 until the predetermined evolution number $I_{stop}$ is reached and population fitness is not less than the termination fitness function value $F_{stop}$, then stopping the evolution, which complete the epigenetic evolution of the population; and Step 8: outputting a test case set; specifically comprises steps of:

after the epigenetic evolution of the population is completed, outputting the population, wherein the population is the test case set meeting requirements. FIG. 2 is a flow chart of test case constraint control based on epigenetics.

Through the above steps, construction of an epigenetic test case constraint control technology is completed; with an epigenetic theory, a program is unchanged during a test, and the epigenetic regulation is performed on various constraints;

comprising on/off, enhancement/attenuation, and genetic/non-genetic control operations to constraints; modification mechanisms similar to methylation and acetylation are provided for constraint regulation. In the present invention, a new constraint epigenetic operation operator is designed, including: constraint methylation-corresponding to constraint on mode, which can be added to subsequent genetic processes; and constraint acetylation-corresponding to constraint off mode, which can avoid being added to the subsequent genetic processes. This technology consider actual constraints faced by software operations into design of the test cases during testing, helping testers to design test cases that are more in line with the actual operation conditions of the software, to find more potential software failures, and to improve the quality of software testing.

The failure prediction technology is constructed based on the epigenetic theory to form a more practical test case constraint control technology based on epigenetics.

The present invention has not been described in detail in the prior art or well known in the art.

One skilled in the art will understand that the embodiment of the present invention as shown in the drawings and described above is exemplary only and not intended to be limiting, and is subject to change without departure from such principles. Therefore, this invention includes all modifications encompassed within the spirit and scope of the following claims.

What is claimed is:

1. A construction method of a test case constraint control technology based on epigenetics, comprising steps of:
Step 1: defining a fitness function, a genetic coding method, and a constraint control rule;
Step 2: initializing parameters: setting a population size $N_{pop}$, an evolution number $I_{stop}$, and a termination fitness function value $F_{stop}$;
Step 3: initializing a population: randomly generating an initial population;
Step 4: performing evolution termination judgment;
Step 5: performing constraint regulation based on the epigenetics: performing constraint methylation and constraint acetylation according to the constraint control rule;
Step 6: selecting individuals in the population;
Step 7: completing epigenetic evolution of the population; and
Step 8: outputting a test case set;
wherein:
in the step 1, the fitness function, the genetic coding method, and the constraint control rule are defined as: the fitness function is a measure of individual survival in the evolution of the population; in the software test, a coverage reflects a quality of the test case set; in the construction method, the coverage is used as the fitness function F(x), wherein the coverage is obtained with a test tool Testbed;

coding refers to describing a feasible solution to a problem, which is a method for converting the feasible solution from a solution space of a practical problem to a search space which can be processed by an epigenetic method; the construction method selects real number coding, wherein assuming a variable of one individual has D dimensions, then an i-th individual $X_i$ of the population is expressed as $X_i=[x_{i1}, x_{i2}, \cdots, x_{ij}, \cdots, x_{iD}]$, wherein i=1, 2, $\cdots$, $N_{pop}$, j=1, 2, $\cdots$, D, $N_{pop}$ is a total number of the individuals in the population, $x_{ij}$ is a real variable within a range of $[L_{input}, U_{input}]$, and $[L_{input}, U_{input}]$ is upper and lower limits inputted by the program to be tested;

the constraint control rule refers to determining when the constraints are added, and when the constraints are stopped; wherein from adding to stopping, the constraints inherit with the evolution of the population; wherein sizes of the constraints to be imposed are determined and the constraints refer to hardware environment constraints for the software at runtime, as well as external noise interference constraints; the constraints are presented as interference to inputs of the program during the test, wherein assuming there are $N_C$ possible constraints, a D-dimensional real variable is used to quantify the i-th constraint as $C_i=[c_{i1}, c_{i2}, \cdots, c_{ij}, \cdots, c_{iD}]$, wherein i=1, 2, $\cdots$, $N_C$, j=1, 2, $\cdots$, D, D is a dimension number of the constraints; the dimension number of the individuals of the same population is consistent; a real variable obtained by quantifying the constraints is added to subsequent evolution of the test cases by the constraint regulation, so as to realize genetic evolutionary control of the constraints; the constraint control rule is formulated according to an actual operation of the software, besides start and end times, wherein a value of $C_i$, which represents strength of the constraints, is also determined according to an actual demand, and is selectively added during an evolution process;

wherein in the construction method, the population represents the test case set, and the individuals of the population are the test cases.

2. The construction method, as recited in claim 1, wherein:
in the step 2, initializing the parameters: setting the population size, the evolution number, and the termination fitness function value specifically comprises steps of: setting the population size $N_{pop}$, the evolution number $I_{stop}$, and the termination fitness function value $F_{stop}$ according to actual needs;
wherein the population size $N_{pop}$ represents how many test cases are generated at a time, which is determined according to actual conditions of the program to be tested.

3. The construction method, as recited in claim 1, wherein:
in the step 3, initializing the population: randomly generating the initial population is defined as: expressing an i-th individual $X_i$ of the population as $X_i=[x_{i1}, x_{i2}, \cdots, x_{ij}, \cdots, x_{iD}]$, and randomly selecting $x_{ij}$ within a range of $[L_{input}, U_{input}]$ to determine a value of the individual $X_i$, so as to generate the initial population and mark the initial population with $P_0$.

4. The construction method, as recited in claim 1, wherein:
in the step 4, performing the evolution termination judgment specifically comprises steps of: using a software test tool Testbed to obtain a fitness function value F of the initial population; if $F<F_{stop}$ and an evolution number is smaller than the termination evolution number $I_{stop}$, then continuing the epigenetic evolution of the population; otherwise, stopping the evolution and outputting the initial population as the test case set.

5. The construction method, as recited in claim 1, wherein:
in the step 5, performing the constraint regulation based on the epigenetics: performing the constraint methylation and the constraint acetylation according to the constraint control rule is defined as: constraint methylation-corresponding to a constraint on mode adding a quantized constraint $C_i$ into the population to participate in the evolution; and mutating the individual by adding the constraint to the individual, so as to generate a new individual; wherein $X_i'$ is used to mark the new individual generated by methylation, and $X_i'=X_i+\lambda C_i$, wherein $\lambda$ is a scaling factor, and an intensity of the constraint is controlled by setting a value of $\lambda$; wherein all individuals of a population $P_0$ are updated, thus forming a new population $P_0'$, which is the evolution of the population; wherein if the constraint is not stopped, the constraint always exists in a genetic process, and continues to affect the evolution of the population;
wherein in addition, constraint acetylation-corresponding to a constraint off mode of the construction method sets $\lambda=0$, which stops the constraint, and the constraint no longer affects the evolution of the population.

6. The construction method, as recited in claim 1, wherein:
in the step 6, selecting the individuals specifically comprises steps of: calculating a fitness value of a new population obtained by the epigenetic evolution, selecting $N_{pop}$ individuals with highest fitness among a parent population $P_0$ and a new population $P_0'$, keeping the population size unchanged, and forming a new population $P_1$ for a next round of evolution.

7. The construction method, as recited in claim 1, wherein:
in the step 7, completing the epigenetic evolution of the population specifically comprises steps of: after obtaining a new population $P_1$ by the epigenetic evolution in the step 6, repeating the steps 4-6 until the predetermined evolution number $I_{stop}$ is reached and population fitness is not less than the termination fitness function value $F_{stop}$, then stopping the evolution, which complete the epigenetic evolution of the population.

8. The construction method, as recited in claim 1, wherein:
in the step 8, outputting the test case set specifically comprises steps of: after the epigenetic evolution of the population is completed, outputting the population.

\* \* \* \* \*